UNITED STATES PATENT OFFICE.

ARTHUR C. SPENCER, OF WASHINGTON, DISTRICT OF COLUMBIA, ASSIGNOR OF ONE-THIRD TO ARCHIBALD COX, OF NEW YORK, N. Y.

MANUFACTURE OF POTASH AND CEMENT.

1,312,592.  Specification of Letters Patent.  Patented Aug. 12, 1919.

No Drawing.  Application filed August 24, 1917. Serial No. 188,030.

*To all whom it may concern:*

Be it known that I, ARTHUR C. SPENCER, a citizen of the United States, residing at Washington, in the District of Columbia, have invented certain new and useful Improvements in the Manufacture of Potash and Cement, of which the following is a specification.

This invention relates to the manufacture of potash and cement and it comprises a method of producing potash from natural potassiferous minerals, such as feldspar, mica, leucite, nephelite, glauconite, etc., and rocks and earthy materials containing the same while simultaneously producing materials of cement value wherein such a potassiferous material is heated under conditions appropriate for fritting or sintering the same and for volatilizing potash until a clinker is made and a substantial proportion of potash volatilized; the resultant clinker being then ground or otherwise comminuted and once more subjected to heat for the purpose of again forming clinker and volatilizing a substantial proportion of such potash as remains after the first treatment; all as more fully hereinafter set forth and as claimed.

As is well known, potash though relatively abundant in nature in the form of various silicates containing it is relatively expensive in water soluble or available form, that is available for agricultural purposes; and particularly under present conditions. Many silicates and silicate rocks contain large proportions of potash. Feldspar (orthoclase) contains upward of 16 per cent. of potash, ($K_2O$) when in a pure state and can readily be obtained commercially containing 10 to 12 per cent. Many other minerals, such as glauconite, nephelite and mica are nearly as rich in potash. Many rocks like granites, gneisses and mica-schists or phyllites, etc., contain much potash. Even ordinary clays frequently contain large amounts. A common material known as greensand marl contains a mineral called glauconite which is substantially a double silicate of iron and potassium. The other minerals named contain, substantially, double silicates of aluminum and potassium. Both alumina and iron oxid are ingredients of different types of cement compounds, ordinary cement being in substance a double silicate of lime and alumina while ferrocement is an analogous composition containing iron oxid replacing the alumina.

It is the object of the present invention to render potash occurring in nature in these natural siliceous forms available for use in the arts.

In certain prior patents (Nos. 1,209,135 and 1,209,219) I and one Edwin C. Eckel have described and claimed various methods of making cement and recovering potash wherein minerals or earthy or rocky materials of the character described are mingled with lime or limestone and passed through a rotary kiln under cement forming conditions. Under these circumstances the potassiferous minerals break up, the potash being replaced by lime and being converted into a fume which may be and is recovered. In a modification of this invention calcium chlorid or the like is used in connection with the lime to cause the formation of potassium chlorid. In one modification of the patented invention, the mixture is heated to form cement and the potash fumed off the whole being done in one operation. In another embodiment the heating may be in two stages with a potash recovery in each stage; the first such heating merely to calcination to convert the limestone (calcium carbonate) into free lime while the second heating converts the calcines into clinker.

In order to obtain a high recovery of potash in the performance of the stated method it is in practice necessary to give a rather prolonged heat treatment between the time of introduction of the mixture into the kiln or kilns and the time of removal as finished clinker. This is for the reason that the removal of the potash by fuming off is substantially an evaporation and as in all evaporations the time factor is important. For this reason in the patented method stated it is desirable to give rather a slow progression of the material through the heating zone. A useful expedient is to direct a limited amount of steam into the waste gases going from the cement kiln and then sharply cool. This results in the formation of a mist or fog of water droplets which carry down potash fume very effectively. Electrical precipitation may be advantageously employed in conjunction with the stated formation of fog, thereby cutting down the amount of steam necessary.

I have found that I can secure certain important improvements in the described process by a double clinker-making operation; that is, I first produce a clinker from the materials and then reheat this clinker to form clinker again. In so doing, I can secure a higher recovery of potash with a given time of heat treatment of the materials in the kilns. In practice, I make a mixture of potassiferous siliceous material which may be any of the mineral matters hereinbefore stated, with limestone, lime or other calciferous material and run the mixture through a kiln, the temperature conditions being so controlled as to calcine and clinker the material. A substantial proportion of the potash is always removed in this stage. The clinker thus formed is next ground and it is then subjected to a second clinkering operation. In the regrinding and remixture a very effective contact of the calcareous material and the potassiferous material is effected and new surfaces are presented for volatilization of potash. In its progress through the kiln in this second heating the remaining potash is very effectually removed. This operation offers the further advantage that in the final clinker the various components are combined together with a uniformity and completeness which is not common in cement clinker made in the usual way. In most cement clinker the combination is not altogether complete.

Both clinkering operations may be performed in any ordinary type of rotary cement kiln. Both may be in the same kiln or they may be in different kilns as convenience may dictate. The clinker given by the first operation may be comminuted or ground in any suitable manner to prepare it for the second operation. An advantageous way of pulverizing is to sprinkle the hot material with a little water. This checks and cracks it and renders grinding or otherwise comminuting less difficult. Or enough water may be employed to break down the clinker altogether. Water used for fracturing or comminution is volatilized in the second heating and does no harm.

The potash removed in the two clinkering operations is collected from the dust and gases of the kiln in any suitable way. In recovering the potash by precipitation of the potash fumes in the gases coming from the kiln, it is often advantageous to perform the precipitation in a plurality of stages, thereby obtaining a purer potash in one fraction.

In the stated operation it is not necessary that the initial mixture of potassiferous material and limestone be made in the proper proportions for forming cement clinker. In a normal cement clinker, the ratio of lime to other components is usually somewhat less than sufficient to enable the composition to be described as tribasic, i. e., as having sufficient lime to furnish 3 CaO for each $SiO_2$ and each $Al_2O_3$ (or $Al_2O_3$ and $Fe_2O_3$ together). A mixture can be made in other proportions and submitted to the first clinkering operation, the clinker ground and then the composition corrected by addition of more lime or of more of the potassiferous siliceous material prior to the second clinkering. In fact there are advantages both in the use of less lime and of more lime than the amount necessary to form a good cement clinker with the potassiferous silicate in performing this first heating operation. Using less lime in the mixture, in the first burning, the operation (while it does not make a true cement clinker in the usual sense) produces a clinker-like composition in which a relatively large amount of siliceous material is chemically acted on and converted; the lime acting in a chemical way to displace the potash and render it, so to speak, free. With this small amount of lime, a considerable amount of potash is recovered in the first heating while in the second heating the potash is in a form where it volatilizes very readily with the aid of more lime; the lime which is added prior to the second heating for the purpose of correcting the composition. In making the first clinker with a small amount of lime as just described it is found that on disintegration with water in the manner described as above a certain amount of potash may go into the solution. From the solution it may be readily recovered. On the other hand by using a relatively large amount of lime, in making the mixture submitted to the first clinkering operation, potash is quite effectively displaced in the first heating. The clinker produced, because of the presence of the excess of lime, disintegrates readily on sprinkling with water. The rest of the potash is recovered in the second heating. As stated, with either the use of a deficiency or of an excess of lime in the first heating, the composition of the clinker is corrected before the second heating by the addition of more siliceous material or of more lime as the case may be. As an example, in making cement from ordinary feldspar with the right proportion of lime, there may be employed about three parts of limestone to one part of feldspar. This proportion may be used in the present process. Or, as stated, I may use either less or more than this proportion in the first heating, correcting the composition of the mixture prior to the second heating by the addition of more lime or of more feldspar.

While I have hereinbefore described more particularly the present invention as applied to the manufacture of cements which are like ordinary Portland cements, that is composed of silica, alumina, and lime, with iron present in but minor proportions, yet the present invention may equally well be applied to the manufacture of what is known as ferrocement; that is, a cement in which iron oxid ($Fe_2O_3$) replaces alumina ($Al_2O_3$) and to this end I substitute glauconite or greensand for the feldspar in the example hereinbefore given. In this case less lime is required inasmuch as glauconite contains a smaller proportion of silica than feldspar.

In some cases it is desirable to employ two or more potassiferous materials in carrying out the present process. For instance I have obtained particularly good results in volatilization of potash by using in admixture a relatively siliceous type of material (of which feldspar or phyllite are good examples) with a more highly ferruginous or aluminous type of material such as galuconite or nephelite syenite. This plan is particularly useful in the modification where a mixture carrying an extra amount of lime is used for the first or preliminary clinkering step; that is more lime than enough to make either a normal clinker or a tribasic clinker. Such a composition gives a ready clinkering action and a copious evolution of potash fumes.

To the same end of ready clinkering and volatilization the use of fluxes such as cryolite, calcium chlorid, calcium fluorid, sodium chlorid, sodium sulfate, etc., may be advantageous. It is commonly best to introduce any nonsiliceous fluxing material prior to the first clinkering stage; although flux may be used in either one or both of the clinkering stages.

The ordinary rotary kilns now used for making Portland cement may be used in the present invention and very advantageously. These kilns may be in one or more sections.

What I claim is:—

1. Process of obtaining potassium compounds which comprises heating a calcareous potassiferous silicate mixture under conditions favorable for the production of potassic fume and clinker nodules, disintegrating the clinker and reheating to induce further evolution of potassic fume.

2. Process of obtaining potassium compounds which comprises heating a calcareous potassiferous silicate mixture under conditions favorable for the production of potassic fume and clinker nodules, disintegrating the clinker, incorporating cement making materials and reheating to induce further evolution of potassic fume.

3. Process of obtaining potassium compounds which comprises heating a potassiferous hydraulic cement mixture under conditions favorable for the production of potassic fume and clinker nodules, disintegrating the clinker and reheating to induce further evolution of potassic fume.

4. Process of obtaining potassium compounds which comprises heating a potassiferous calcareo-siliceous mixture essentially richer in lime than any normal cement mixture under conditions favoring the production of potassic fume, incorporating siliceous material with unvolatilized residue and reheating to induce further evolution of potassic fume.

5. Process of obtaining potassium compounds which comprises heating a potassiferous calcareo-siliceous mixture essentially richer in lime than any normal cement mixture under conditions favoring the production of potassic fume, incorporating siliceous material with unvolatilized residue and reheating to induce further evolution of potassic fume and the formation of cement clinker.

6. Process of producing alkaliferous fume which comprises volatilizing potassium products from a calciferous silicate mixture materially more basic than a hydraulic cement mixture.

7. Process of producing alkaliferous fume which comprises volatilizing potassium products from a calciferous silicate mixture materially more basic than a Portland cement mixture.

8. In the manufacture of potassic fume the concomitant volatilization of potassium products and production of silicate clinker materially more basic than tribasic.

9. In the manufacture of potash and cement clinker, the process which comprises mixing feldspar, nephelite syenite and limestone, heating to produce a potash bearing fume and a clinker, disintegrating the clinker and reheating to induce formation of more fume and produce another clinker.

In testimony whereof, I affix my signature.

ARTHUR C. SPENCER.